UNITED STATES PATENT OFFICE.

ELLA K. ZINGG, OF GREAT VALLEY, NEW YORK, ADMINISTRATRIX OF HERMAN ZINGG, DECEASED, ASSIGNOR OF ONE-HALF TO MARY C. FITTS, OF SALAMANCA, NEW YORK.

PAINT-OIL.

SPECIFICATION forming part of Letters Patent No. 694,085, dated February 25, 1902.

Application filed November 29, 1901. Serial No. 84,331. (No specimens.)

*To all whom it may concern:*

Be it known that HERMAN ZINGG, deceased, late a citizen of the United States, and a resident of New York city, New York, did in his lifetime invent a certain new and useful Substitute for Linseed-Oil, of which the following is a specification.

This invention relates to a composition of matter adapted for use in the arts as a substitute for linseed-oil.

The object of the invention is in a ready, simple, cheap, and practical manner to present a composite oil which shall possess all the properties of but be much cheaper in use than pure linseed-oil.

With these and other objects in view, as will appear as the nature of the invention is better understood, the same consists in a substitute for linseed-oil, as will be hereinafter fully described and claimed.

In carrying the invention into effect there is taken of the following ingredients, by measure, gum mixture, forty-two parts; linseed-oil, (boiled,) twenty-five parts; petroleum, (specific gravity 0.757,) thirty-three parts. In combining these ingredients a gum mixture is prepared which consists of ninety per cent. of a suitable gum and ten per cent. of natrium resinate. This mixture is prepared as follows: 1.7 grams of natrium carbonate in a dry state are taken and dissolved in boiling water in volume of from twenty-five to fifty grams, and to this are added one hundred grams of colophony, the whole being thoroughly intermingled and evaporated until dry, care being taken that the temperature does not exceed 100° Fahrenheit; otherwise a brown color will appear, which will detract from the quality of the product. In some instances it may be preferable to have the gum mixture contain less than ten per cent. of natrium resinate—say eight per cent. or even less. The gum mixture thus prepared is dissolved in linseed-oil at a temperature of 100° to 110° Fahrenheit, the heat being continued until a clear solution results, after which the mixture is allowed to cool until its temperature reaches about 70° Fahrenheit, and the petroleum is then added, care being taken constantly to stir the mass until complete incorporation is effected. After cooling or before the composite oil thus produced may be placed in suitable receptacles adapted for handling or shipment.

It is to be understood that the invention is not to be limited to the exact proportions of the ingredients stated nor to the employment of natrium carbonate as a saponifying agent, as other akalies of the sodium group may be employed in lieu thereof, as will be obvious.

Having thus fully described the invention, what is claimed as new, and desired to be secured by Letters Patent, is—

A substitute for linseed-oil, consisting of the following ingredients by measure; a gum mixture, forty-two parts, boiled linseed-oil, twenty-five parts, and petroleum, thirty-three parts.

In testimony whereof I hereunto affix my signature in the presence of two witnesses.

ELLA K. ZINGG,
*Administratrix of the estate of Herman Zingg, deceased.*

Witnesses:
E. B. MORSE,
W. H. HAZARD.